(12) United States Patent
Mizobuchi

(10) Patent No.: US 7,453,515 B2
(45) Date of Patent: Nov. 18, 2008

(54) DATA PROCESSING DEVICE FOR CONTROLLING AUDIO RECORDING AND PICTURE TAKING

(75) Inventor: Koji Mizobuchi, Sagamihara (JP)

(73) Assignee: Olympus Corporation, Tokyo (JP)

( * ) Notice: Subject to any disclaimer, the term of this patent is extended or adjusted under 35 U.S.C. 154(b) by 424 days.

(21) Appl. No.: 10/431,330

(22) Filed: May 7, 2003

(65) Prior Publication Data

US 2004/0027466 A1 Feb. 12, 2004

(30) Foreign Application Priority Data

May 10, 2002 (JP) ............................. 2002-136337
May 1, 2003 (JP) ............................. 2003-126649

(51) Int. Cl.
*H04N 5/225* (2006.01)
*H04N 5/76* (2006.01)

(52) U.S. Cl. .................. 348/372; 348/231.1; 348/220.1

(58) Field of Classification Search ................. 348/272, 348/220.1, 231.3, 231.4, 372
See application file for complete search history.

(56) References Cited

U.S. PATENT DOCUMENTS

| 5,130,812 | A | | 7/1992 | Yamaoka | |
| 5,784,525 | A | * | 7/1998 | Bell | ........................... 386/107 |
| 6,493,828 | B1 | * | 12/2002 | Yamaguchi et al. | ......... 713/324 |
| 7,113,219 | B2 | * | 9/2006 | Adams et al. | ............... 348/374 |
| 2002/0021361 | A1 | * | 2/2002 | Kitajima et al. | ............. 348/232 |
| 2002/0030744 | A1 | * | 3/2002 | Sawachi | ..................... 348/207 |
| 2002/0176703 | A1 | * | 11/2002 | Takahashi et al. | ........... 386/120 |
| 2003/0174218 | A1 | * | 9/2003 | Battles et al. | ............ 348/231.4 |
| 2004/0018004 | A1 | * | 1/2004 | Mizobuchi | .................... 386/96 |

FOREIGN PATENT DOCUMENTS

| JP | 02-193472 | 7/1990 |
| JP | 06-022258 | 1/1994 |
| JP | 09-219806 | 8/1997 |
| JP | 2001-320626 | 11/2001 |

OTHER PUBLICATIONS

Notice of Examiner's Reasons for Rejection for Japanese Patent Application No. 2003-126649, mailed Mar. 18, 2008 (2 pgs.) with translation (2 pgs.).

* cited by examiner

*Primary Examiner*—Lin Ye
*Assistant Examiner*—Kelly Jerabek
(74) *Attorney, Agent, or Firm*—John C. Pokotylo; Straub and Pokotylo

(57) ABSTRACT

According to the present invention, a data processing device includes an imaging unit for outputting a taken picture as image data, a memory for temporarily storing the image data output from the imaging unit every at least one frame, a power source for applying power to the imaging unit and the memory, and a plurality of operation switches. Only when a predetermined operation switch of the operation switches is operated, the device controls so as to apply power to the imaging unit and the memory.

12 Claims, 13 Drawing Sheets

TOP VIEW

DATA PROCESSING DEVICE FOR CONTROLLING AUDIO RECORDING AND PICTURE TAKING

CROSS-REFERENCE TO RELATED APPLICATION

This application claims benefits of Japanese Applications No. 2002-136337 filed in Japan on May 10, 2002, No. 2003-126649 filed in Japan on May 1, 2003, the contents of which are incorporated by this reference.

BACKGROUND OF THE INVENTION

1. Field of the Invention

The present invention relates to a data processing device and, more particularly, to a data processing device in an audio recording and playback apparatus with an imaging function.

2. Related Art Statement

As is generally known, portable audio recording and playback apparatuses (hereinbelow, referred to as IC recorders) have been put into practical use. This kind of IC recorder converts an audio signal into digital data, stores the digital data in a flash memory serving as a rewritable storage medium, converts the audio data stored in the flash memory into an analog audio signal, and then plays back the analog audio signal.

As the characteristics of the above IC recorder, various operation modes such as recording, playback, fast-forward, and fast-rewind can be selectively operated by operating predetermined switches. For example, when the recording mode is selected, audio data converted as a digital signal is stored in an audio data area and index information (the address of this audio data, recording date and time, and the like) related to the audio data is stored in an index information area, these areas being previously formed in the flash memory.

On the other hand, electronic still cameras which can record not only images but also sounds have been put into practical use. In this kind of electronic still camera, however, the most part of the limited storage capacity thereof has to be used for image recording. Therefore, audio recording time per image is fairly short, for example, tens of seconds.

Japanese Unexamined Patent Application Publication No. 6-22258 discloses an electronic still camera which includes an audio recording medium, separated from an image recording medium, thus realizing a long audio recording time. In this camera, a sound is instantaneously outputted upon image playback, thus relating audio recording to the absolute time of a recording start time of each image.

Further, in the electronic still camera, a release time lag has to be minimized as much as possible in terms of the fundamental performance of the camera. Accordingly, a power switch is disposed separately from the release switch. Simultaneously with turn-on of the power switch, power is applied to the whole of a system including imaging devices such as a CCD and a CMOS sensor. Thus, the system is set in a standby mode so that picture taking can be immediately performed whenever the release switch is pressed.

Under energized conditions, battery power is heavily consumed. Japanese Unexamined Patent Application Publication No. 2001-320626 discloses an electronic still camera in which a power saving mode is set in order to realize lower power consumption while the minimum function of the electronic still camera is being used any time.

BRIEF SUMMARY OF THE INVENTION

According to the present invention, in brief, there is provided a data processing device including: an imaging unit for outputting a taken picture as image data; a storage unit for temporarily storing the image data output from the imaging unit every at least one frame; a power source for applying power to the imaging unit and the storage unit; a plurality of operation switches; and a control unit for controlling so as to apply power to the imaging unit and the storage unit only when a predetermined operation switch of the operation switches is operated.

Additional features and advantages of the invention will be set forth in the description which follows, and in part will be obvious from the description, or may be learned by practice of the invention. The features and advantages of the invention may be realized and obtained by means of the instrumentalities and combinations particularly pointed out hereinafter.

DETAILED DESCRIPTION OF THE PREFERRED EMBODIMENTS

Embodiments of the present invention will now be described hereinbelow with reference to the drawings.

Figure 1:
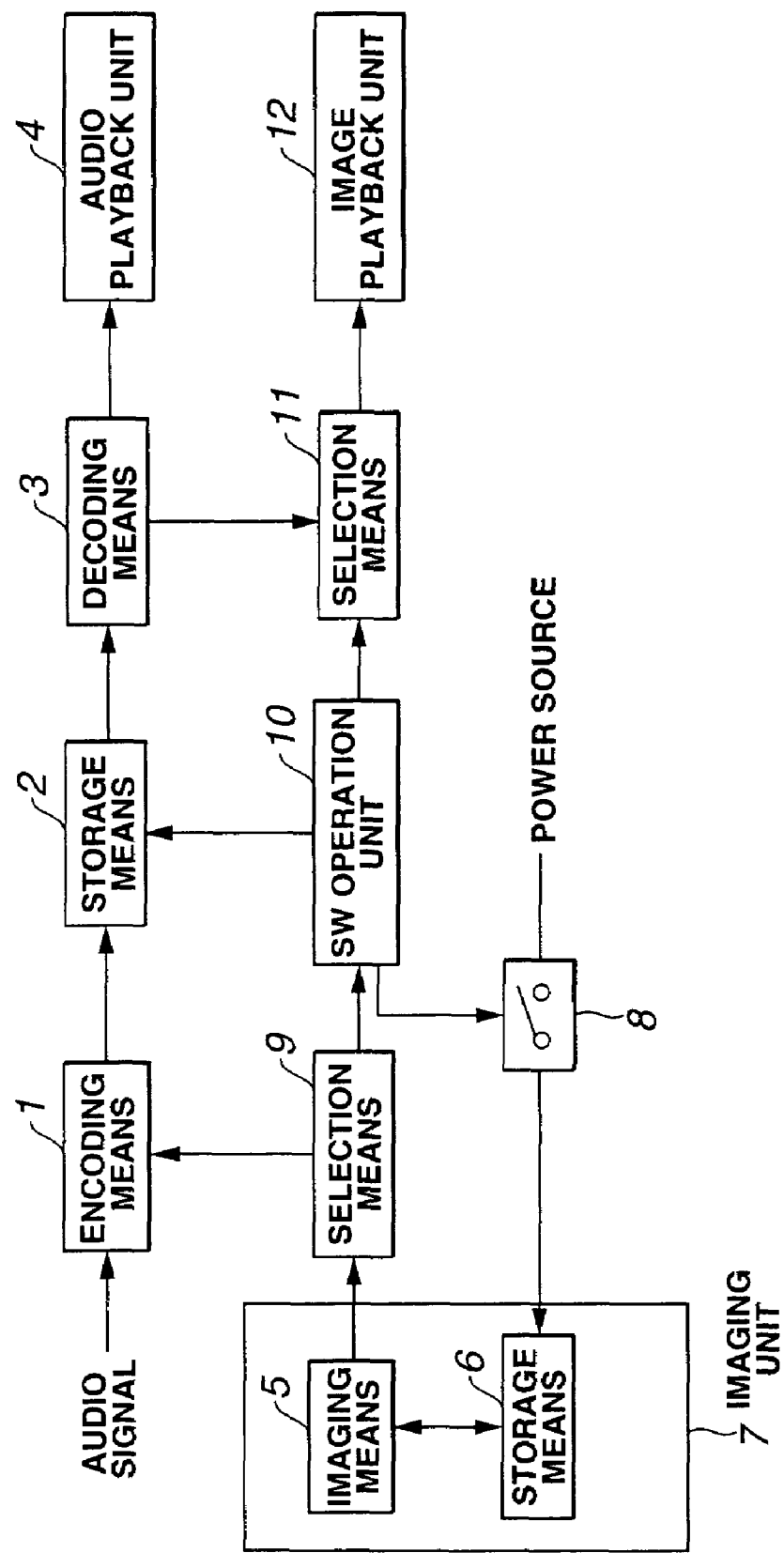
FIG. 1 is a block diagram schematically showing the structure of a data processing device according to a first embodiment of the present invention.

FIG. 1 is a block diagram schematically showing the structure of a data processing device according to a first embodiment of the present invention.

As shown in FIG. 1, according to the present embodiment, as essential parts, the data processing device comprises encoding means 1 for encoding an audio signal and an image signal to audio data and image data according to respective predetermined formats, respectively, an imaging unit 7 having imaging means 5 for taking a picture of a subject and storage means 6 for temporarily storing image data output from the imaging means 5 every at least one frame, an SW operation unit 10 having a plurality of operation switches, switching means 8 for supplying power to the imaging unit 7 only for a period during which predetermined image processing is performed when a specified switch of the SW operation unit 10 is operated, selection means 9 for operating the specified switch of the SW operation unit 10 only upon recording to input image data of the imaging unit 7 to the encoding means 1, storage means 2 for storing the audio data and image data related to the audio data, decoding means 3 for decoding the audio data and the image data, read from the storage means 2, to an audio signal and an image signal, respectively, according to respective predetermined decoding formats upon playback, an audio playback unit 4 for playing back the decoded audio signal as a sound, an image playback unit 12 for playing back the decoded image signal as an image, and selection means 11 for selectively generating an image signal alone, related to the audio signal, to the image playback unit 12.

The specified switch of the SW operation unit 10 comprises a two-stage switch including a first release switch and a second release switch. When a release button is pressed to a first stage, the first release switch is turned on to start the application of power to the imaging unit 7. When this button is pressed to a second stage, the second release switch is turned on. The application of power to the imaging unit 7 is interrupted simultaneously with the turn-off of the first release switch or the turn-off of the second release switch after the predetermined image processing. When the second release switch is turned on, the imaging operation is started.

Figure 2:
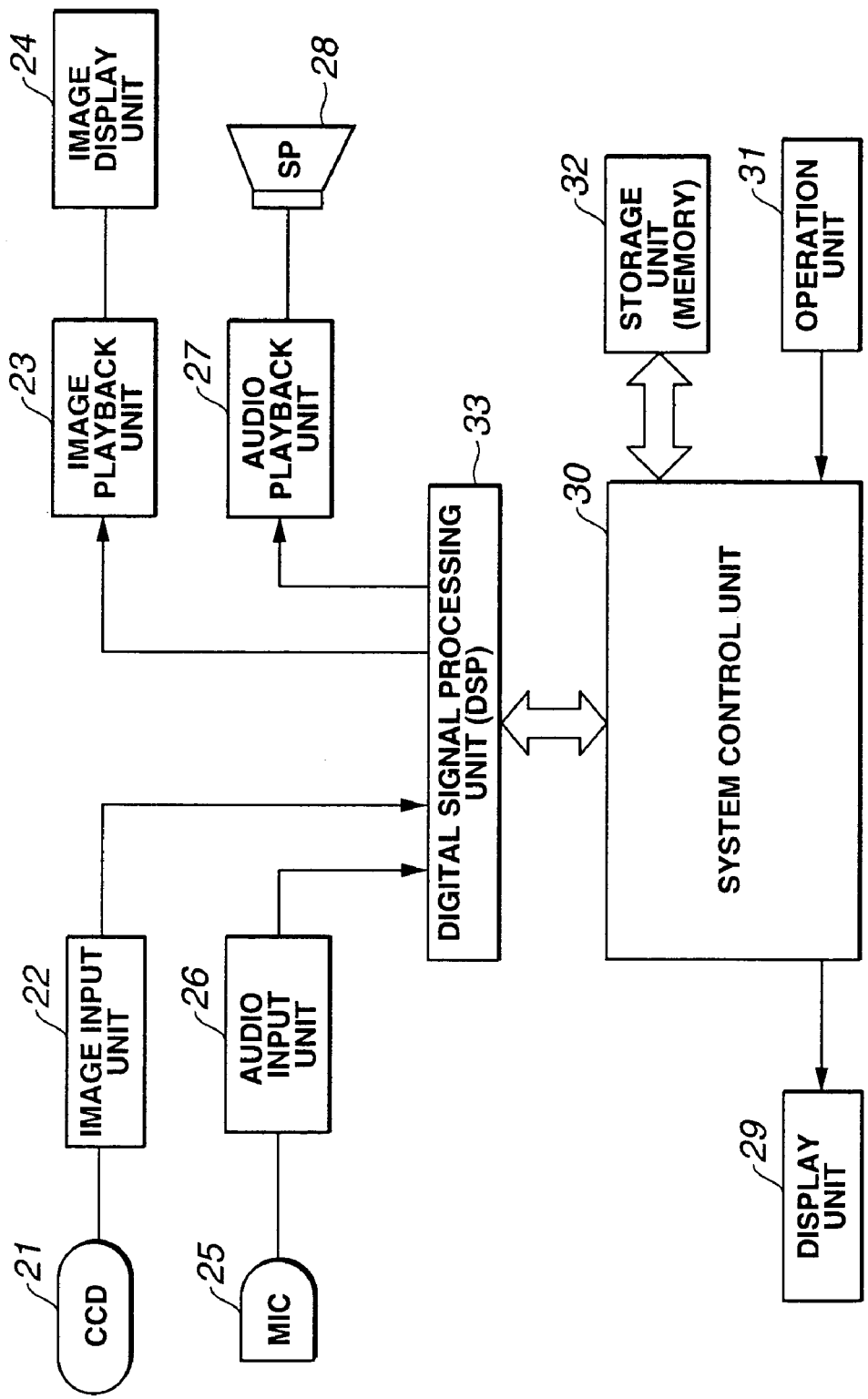
FIG. 2 is a block diagram showing the concrete structure of the data processing device according to the first embodiment.

FIG. 2 is a block diagram showing the concrete structure of the data processing device according to the first embodiment.

Referring to FIG. 2, an output terminal of a microphone (MIC) 25, which converts a sound into an electric signal, is connected to an input terminal of an audio input unit 26. An output terminal of the audio input unit 26 is connected to an input terminal of a digital signal processing unit (DSP) 33.

Further, an output terminal of the digital signal processing unit 33 is connected to an input terminal of an audio playback unit 27. An output terminal of the audio playback unit 27 is connected to an input terminal of a speaker (SP) 28.

Similarly, an output terminal of an imaging device (CCD) 21, which converts an image into an electric signal, is connected to an input terminal of an image input unit 22. An output terminal of the image input unit 22 is connected to the input terminal of the digital signal processing unit (DSP) 33.

Further, the output terminal of the digital signal processing unit 33 is connected to an input terminal of an image playback unit 23. An output terminal of the image playback unit 23 is connected to an input terminal of an image display unit 24 comprising, for example, a TFT type LCD.

The audio input unit 26 comprises a microphone amplifier for amplifying an electric signal supplied from the microphone 25, a low-pass filter for cutting an unnecessary frequency band, and a A/D converter for converting an input audio signal (analog signal) into a digital signal, these components being not shown in the diagram.

The audio playback unit 27 comprises a D/A converter for converting an input digital signal into an analog signal, a low-pass filter for cutting an unnecessary frequency band, and a power amplifier for amplifying an audio signal, these components being not shown in the diagram.

The image input unit 22 comprises various circuits for controlling iris, gain, and white balance, and an A/D converter, these components being not shown in the diagram. The image input unit 22 converts various pixel signals supplied from the imaging device 21 into digital signals.

The image playback unit 23 comprises a video control circuit and a D/A converter, these components being not shown in the diagram. The image playback unit 23 converts an input digital signal into an analog signal.

The digital signal processing unit 33 is controlled by a system control unit 30, which will be described later. Upon recording, the digital signal processing unit 33 encodes (compresses) audio and image digital signals to audio data and image data in the respective predetermined encoding formats every frame. The encoded data is temporarily stored in a buffer memory (not shown) of the system control unit 30. Upon playback, the digital signal processing unit 33 decodes (decompresses) audio data and image data from the buffer memory every frame.

The digital signal processing unit 33 is connected to the system control unit 30. In addition to the digital signal processing unit 33, a storage unit (memory) 32, an operation unit 31, and a display unit 29 are connected to the system control unit 30.

The system control unit 30 comprises, for example, a CPU and controls the whole of the present device. The system control unit 30 includes control means for controlling so as to apply power to the imaging means and the storage means when a predetermined operation switch of the operation unit 31 is operated. The storage unit 32 comprises a nonvolatile semiconductor memory such as a flash memory. Upon recording, the storage unit 32 stores audio data and image data, encoded by the digital signal processing unit 33, through the buffer memory (not shown) of the system control unit 30. At this time, the storage unit 32 also stores index information regarding audio data and image data.

The operation unit 31 includes operation switches for controlling various functions. Namely, the operation unit 31 comprises a recording switch (REC), a playback switch (PLAY), a stop switch (STOP), a fast-forward switch (FF), a fast-rewind switch (REW), a menu switch (MENU), a hold switch (HOLD), and an erasing switch (ERASE).

The display unit 29 displays an operation mode indicated when a predetermined sequence operation is started by operating any switch of the operation unit 31, or a situation of the subsequent operation. For example, when the recording switch (REC) is pressed, the display unit 29 displays a recording elapsed time, a recordable remaining time, and a file number. When the menu switch (MENU) is pressed, the display unit 29 displays information related to the selection of functions, for example, the sensitivity of the microphone (high/low), a recording mode (standard/long), and an alarm (on/off). Further, when the system control unit 30 has a clock function, the display unit 29 displays the current date and time. The above information can also be displayed in the image display unit 24.

The operation of the data processing device according to the present embodiment will now be described with reference to FIG. 3.

Figure 3:
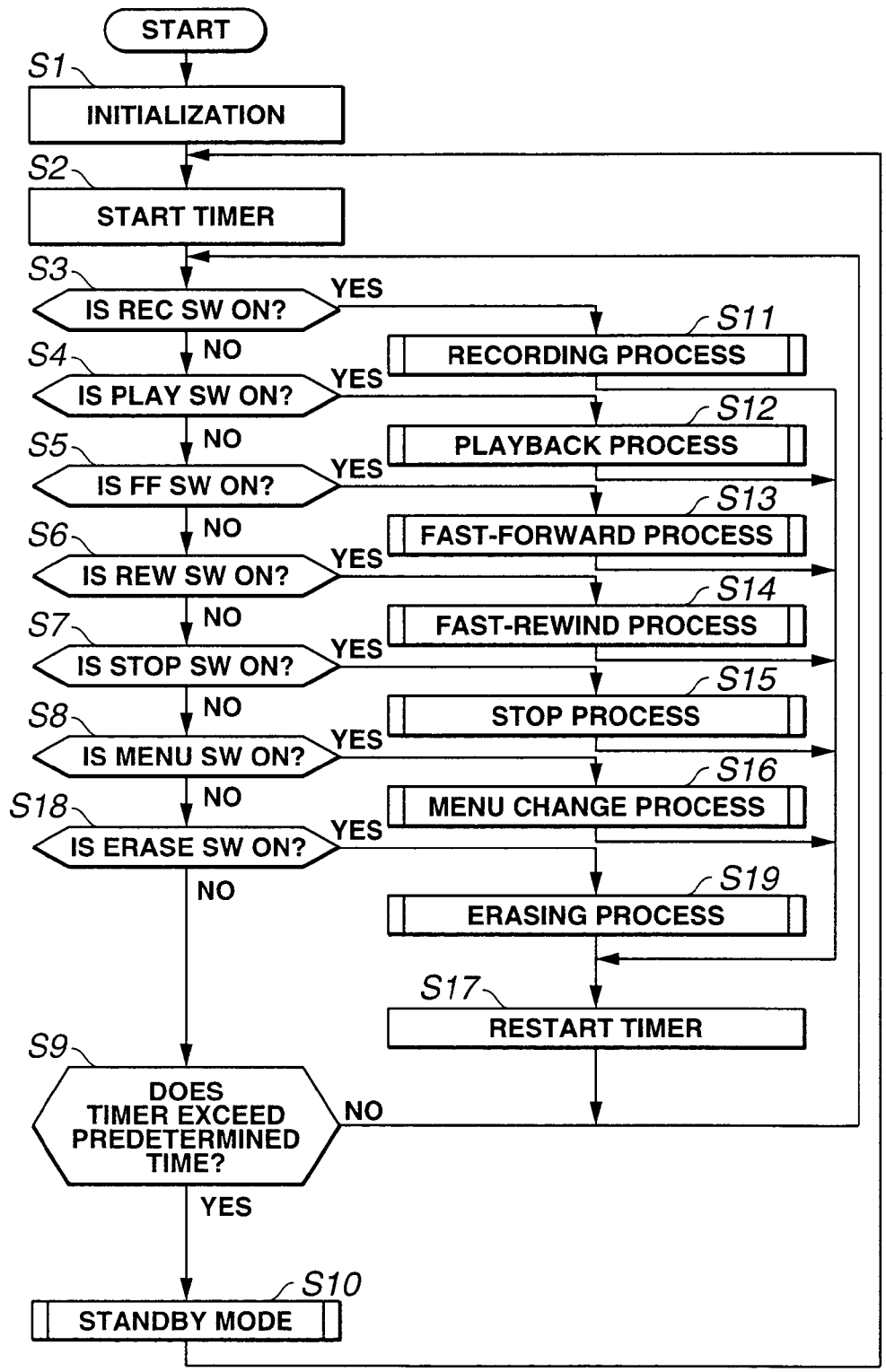
FIG. 3 is a flowchart schematically showing the main operation of the data processing device according to the first embodiment.

FIG. 3 is a flowchart schematically showing the main operation of the data processing device according to the present embodiment.

As shown in this flowchart, in the data processing device, when power is turned on, the system control unit 30 in FIG. 2 performs predetermined initialization in step S1 and then proceeds the operation to step S2. A timer is started in step S2. Then, the operation proceeds to step S3. The timer is used to clock an elapsed time until the data processing device in the normal operation mode enters a standby mode (low current consumption mode) after a predetermined elapsed time.

When the data processing device enters the operation mode, in steps S3 to S8 and S18, the system control unit 30 sequentially detects whether each of the switches of the operation unit 31 is on in the order of the recording switch (REC), the playback switch (PLAY), the fast-forward switch (FF), the fast-rewind switch (REW), the stop switch (STOP), the menu switch (MENU), and the erasing switch (ERASE). Each time it is detected that the switch is on, the operation branches from each of the respective steps to each of the corresponding steps S11, S12, S13, S14, S15, S16, and S19, thus executing each of predetermined subroutines such as "recording process", "playback process", "fast-forward process", "fast-rewind process", "stop process", "menu change process", and "erasing process".

After executing each of the subroutines, the system control unit 30 restarts the timer in step S17 and then returns the operation to the main loop.

Various processes such as the above-mentioned fast-forward process, fast-rewind process, stop process, menu change process, and erasing process are performed by well-known techniques. Since these processes are not directly concerned with the content of the present invention, the detailed description thereof is omitted.

When all of the switches are off in steps S3 to S8 and S18, the system control unit 30 proceeds the operation to step S9 and then determines whether the timer exceeds a predetermined elapsed time. If the timer does not exceeds the predetermined elapsed time, the operation is returned to the main flow which begins at step S3. If the timer exceeds the predetermined elapsed time, the operation proceeds to step S10, thus entering a subroutine for the standby mode. Consequently, the device enters the low current consumption mode.

Specifically speaking, the system control unit 30 controls so as to cut off the power to the audio input unit 26, the image input unit 22, the audio playback unit 27, the image playback unit 23, the image display unit 24, the digital signal processing unit 33, the display unit 29, and the storage unit 32 in FIG. 2. Alternatively, the system control unit 30 outputs a non-selection signal to a chip enable terminal provided for an IC (not shown) constituting each of these components. Thus, the device enters the low current consumption mode.

At this time, the CPU, serving as the system control unit 30, changes its own operation clock to a low-speed clock having the minimum current consumption, thus entering the low current consumption mode. The operation clock can be changed from a main clock (for example, 9.28 MHz) to a sub clock (for example, 37.768 kHz) as necessary. The main clock can be completely stopped until the turn-on of any switch is detected. In the standby mode, when any of the operation switches is operated, the operation clock is again changed to the main clock. The operation is returned to step S2.

The "recording process" in step S11 of the above predetermined subroutines will now be described with reference to a flowchart of FIG. 5, and FIGS. 2 and 4.

Figure 4:
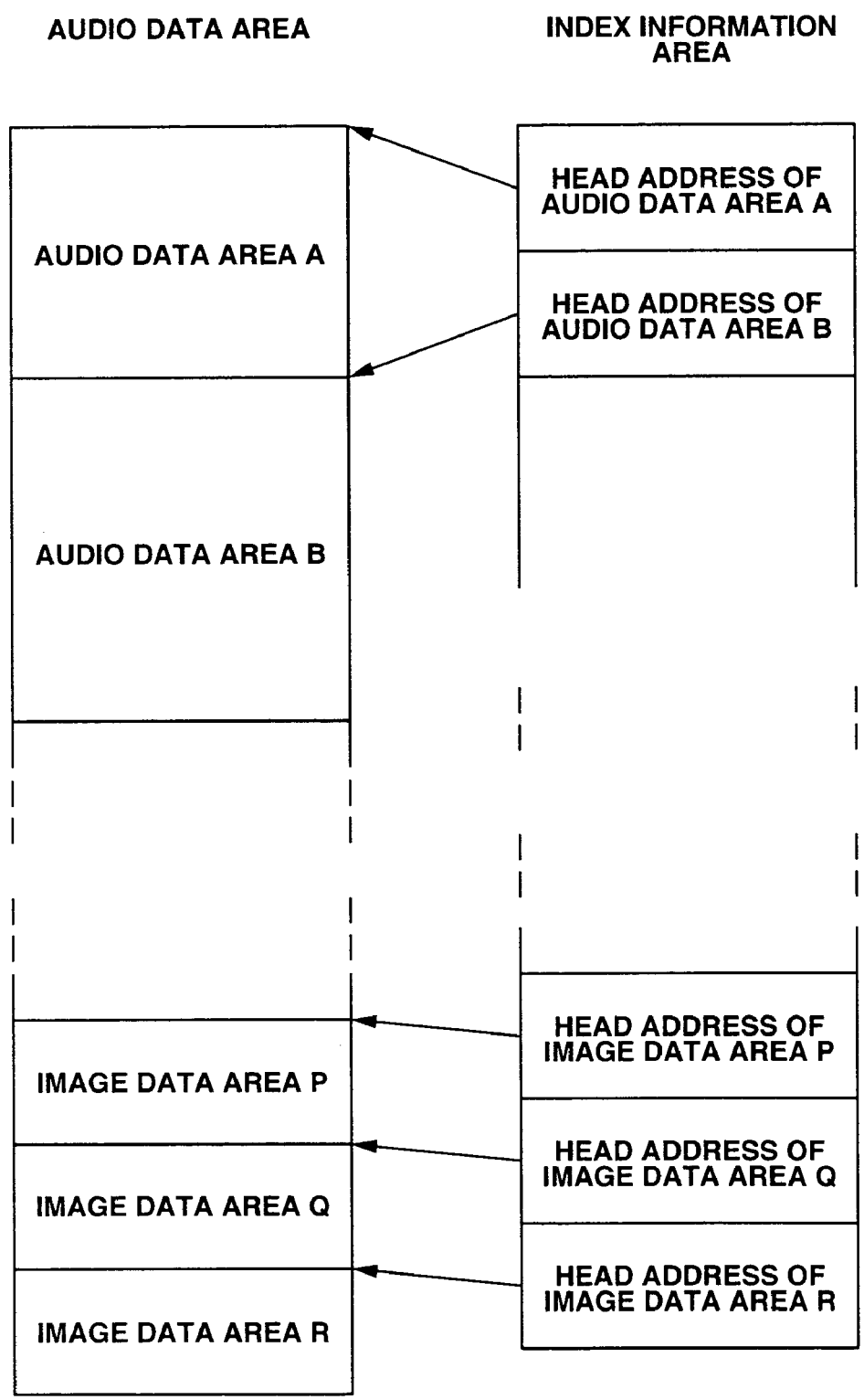
FIG. 4 is a diagram showing the structure of an audio data area and that of an index information area and the relationship therebetween, the areas being stored in a storage unit in FIG. 2.

FIG. 4 shows the structure of an audio data area and that of an index information area and the relationship therebetween, the areas being stored in the storage unit 32 in FIG. 2. FIG. 5 is the flowchart explaining the recording process in FIG. 3 in detail.

Figure 5:
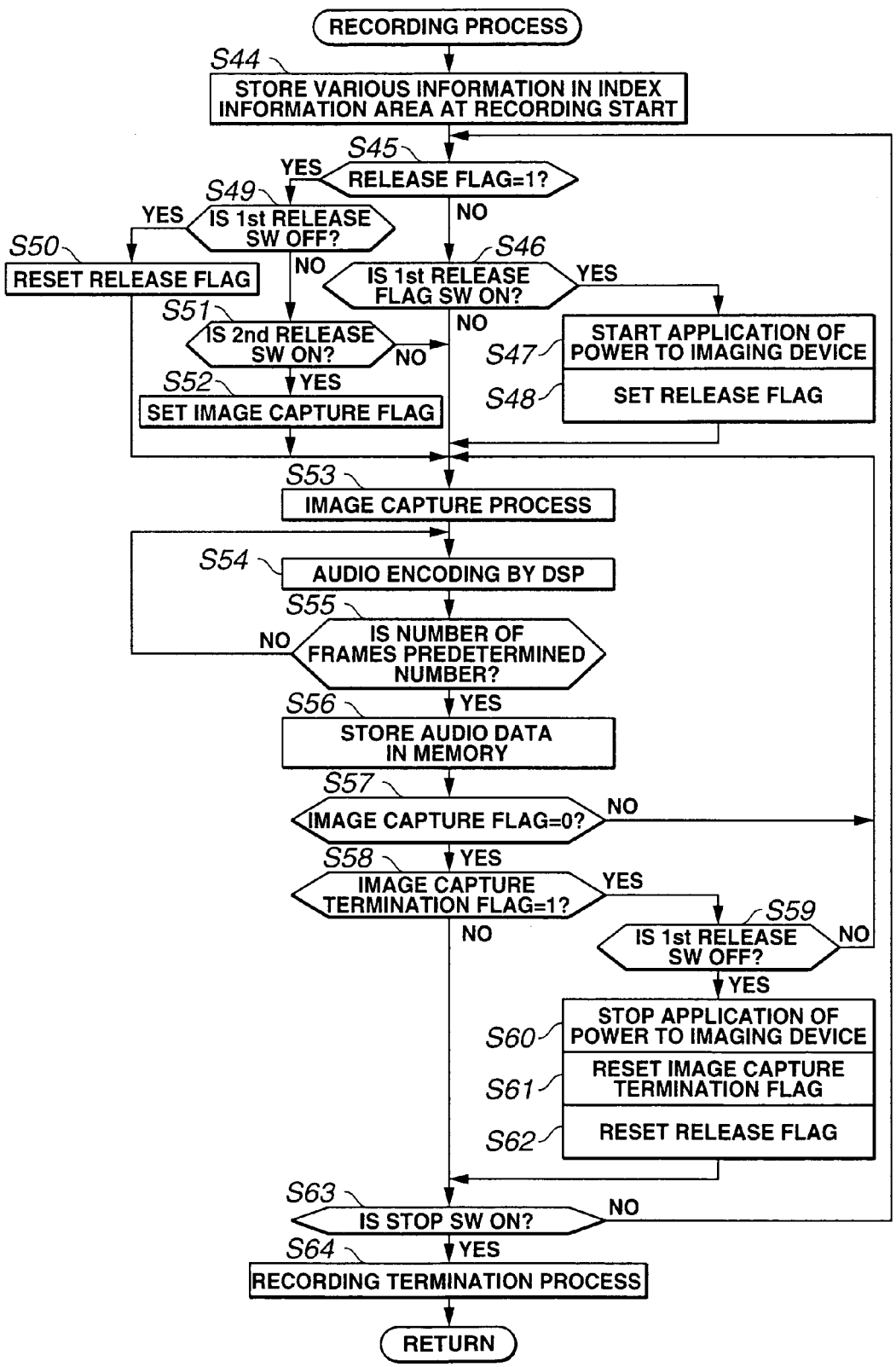
FIG. 5 is a flowchart explaining a recording process in FIG. 3 in detail.

In FIG. 5, when recording is started, under the control of the system control unit 30, in step S44, various information, for example, the sensitivity of the microphone (high/low), the recording mode (standard/long), a file number, and the start address of an audio data storage area to store this audio data are first stored in the index information area in the storage unit 32. Then, the process proceeds to step S45.

The system control unit 30 detects a release flag in step S45. If the release flag is set in step S48, which will be described later, the system control unit 30 branches the process to step S49 because the release flag is set in step S45. In step S49, the system control unit 30 detects the state of a first release switch.

If the first release switch is on in step S49, the system control unit 30 proceeds the process to step S51 and detects the state of a second release switch. If the first release switch is off in step S49, the process branches to step S50. The release flag is reset.

If it is detected in step S51 that the second release switch is on, the system control unit 30 proceeds the process to step S52 and then sets an image capture flag. After that, the process proceeds to step S53 and a subroutine for an image capture process is executed. The above-mentioned first and second release switches are equivalent to a release switch (REL), which will be described later.

If the release flag is not set in step S45 mentioned above, the system control unit 30 proceeds the process to step S46 and then determines whether the first release switch is on during recording. If the first release switch is on, the process branches to step S47 and the application of power to the imaging device is started. Then, the process proceeds to step S48 and the release flag is set. Then, the process proceeds to step S53. The subroutine for the image capture process is executed.

If the first release switch is off in step S46, the process proceeds to step S53 and the subroutine for image capture processing is executed.

The subroutine for the image capture process in step S53 will be described in detail hereinafter with reference to FIG. 6, which will be described later.

In step S53, the subroutine for the image capture process is executed. After that, the process proceeds to step S54 and an audio signal is encoded by the digital signal processing unit 33 under the control of the system control unit 30. Encoding is performed every frame. Accordingly, encoding is continuously performed until the number of frames of audio data reaches a predetermined number of frames.

In step S55, the system control unit 30 determines whether the number of frames of audio data, stored in the buffer memory (not shown) of the system control unit 30, reaches the predetermined number of frames. When the number of frames of audio data reaches the predetermined number, the process proceeds to step S56. The system control unit 30 stores the audio data so that the audio data is written in order from the start address of the audio data storage area in the storage unit 32. For example, when audio data obtained by encoding an audio signal of 10 bits/frame to data of 4 bits/frame is written in the storage unit 32 every 512 bytes, the predetermined number of frames is 1024.

For audio data stored in the storage unit 32, as shown in FIG. 4, audio data is stored so that each of an audio data area A and an audio data area B is stored in order from, for example, a head address of the audio data area. A start address corresponding to the audio data area A and that corresponding to the audio data area B are stored as the head address of the audio data area A and that of the audio data area B in the index information area, respectively. Each time an audio data area is allocated, for example, when an audio data area C, an audio data area D, . . . are formed, the head address of each audio data area is stored in the index information area. The system control unit 30 controls so that the audio data is stored in the storage unit 32 and then proceeds the process to step S57.

In step S57, the system control unit 30 determines whether the image capture flag, which will be described later, is reset. If the image capture flag is reset, under the control of the system control unit 30, encoding of the audio signal and encoding of an image signal, which will be described later, are simultaneously performed by the digital signal processing unit 33. In other words, audio data and image data are alternately stored in the storage unit 32 every predetermined number of frames so that a sound interruption is not caused during picture taking.

If the image capture flag is not reset in step S57, the process is returned to step S53, thus repeating the subroutine for the image capture process.

After image capture is completed, the system control unit 30 advances the process to step S58. While determining whether an image capture termination flag is set, the system control unit 30 controls the respective units so that encoding of audio signals is continued. If the image capture termination flag is set, the system control unit 30 branches the process to step S59 and then detects the state of the first release switch. If it is detected that the first release switch is off, the application of power to the imaging device is stopped in step S60, the image capture termination flag is reset in S61, and the release flag is reset in step S62.

If the first release switch is on in step S59, the process is returned to step S53, thus repeating the subroutine for the image capture process.

Steps S45 to S62 are repeated in accordance with the predetermined release sequence operation until the stop switch (STOP) is turned on in step S63. When the stop switch (STOP) is turned on, the system control unit 30 advances the process to step S64 and executes a recording termination process to terminate the recording. Then, the process is returned.

The "image capture process" in step S53 of the predetermined subroutines will now be described with reference to a flowchart of FIG. 6, and FIGS. 2 and 4.

Figure 6:
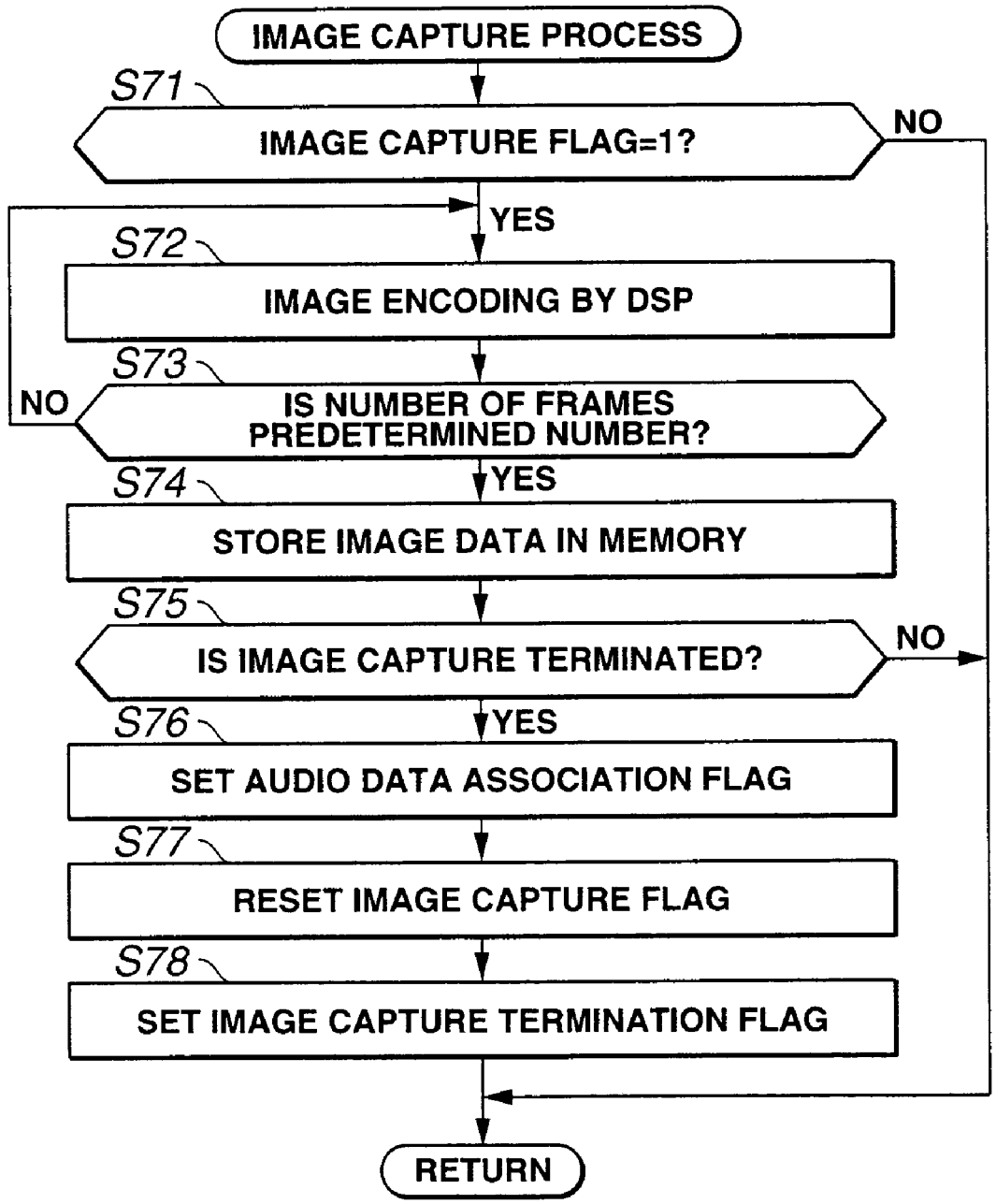
FIG. 6 is a flowchart explaining an image capture process in FIG. 5 in detail.

FIG. 6 is the flowchart explaining the image capture process in FIG. 5 in detail.

In step S71, the system control unit 30 first detects whether the image capture flag is set. If the flag is not set, the normal recording process is executed. If the flag is set, the imaging operation is performed. Accordingly, the process proceeds to step S72. The system control unit 30 controls the digital signal processing unit 33 to encode a captured image signal. Encoding is performed every frame in the same way as the case of audio data. Encoding is continued until the number of frames of image data reaches a predetermined number of frames. Subsequently, in step S73, when the number of frames of image data, stored in the buffer memory (not shown) of the system control unit 30, reaches the predetermined number of frames, the system control unit 30 proceeds the process to step S74 and then stores the image data in the storage unit 32 so that the image data is written in order from the start address of the image data storage area in the storage unit 32.

For image data stored in the storage unit 32, as shown in FIG. 4, image data is stored in order from the start address of an image data area, for example, from the final address of the audio data area. A start address corresponding to an image data area P, that corresponding to an image data area Q, and that corresponding to an image data area R are stored in the index information area as the head address of the image data area P, that of the image data area Q, and that of the image data area R, respectively. In the same way as the case of the above-mentioned audio data, the image data is stored in such a manner that each time an image data area is allocated, the head address of the image data area is stored in the index information area.

Steps S71 to S74 are repetitively performed until image capture is completed. After the image capture is terminated in step S75, the system control unit 30 sets an audio data association flag in step S76 and then resets the image capture flag in step S77. Subsequently, the system control unit 30 sets the image capture termination flag in step S78 to terminate the present subroutine. When determining in step S75 that the image capture is not terminated, the process is returned to the main routine.

Resetting of the image capture flag in step S77 and setting of the image capture termination flag in step S78 correspond to steps S57 and S58 in FIG. 6, respectively.

The audio data association flag will be described in detail in the image playback process, which will be explained hereinbelow.

Next, the "playback process" in step S12 in FIG. 3 will now be described with reference to a flowchart of FIG. 7, and FIG. 2.

Figure 7:
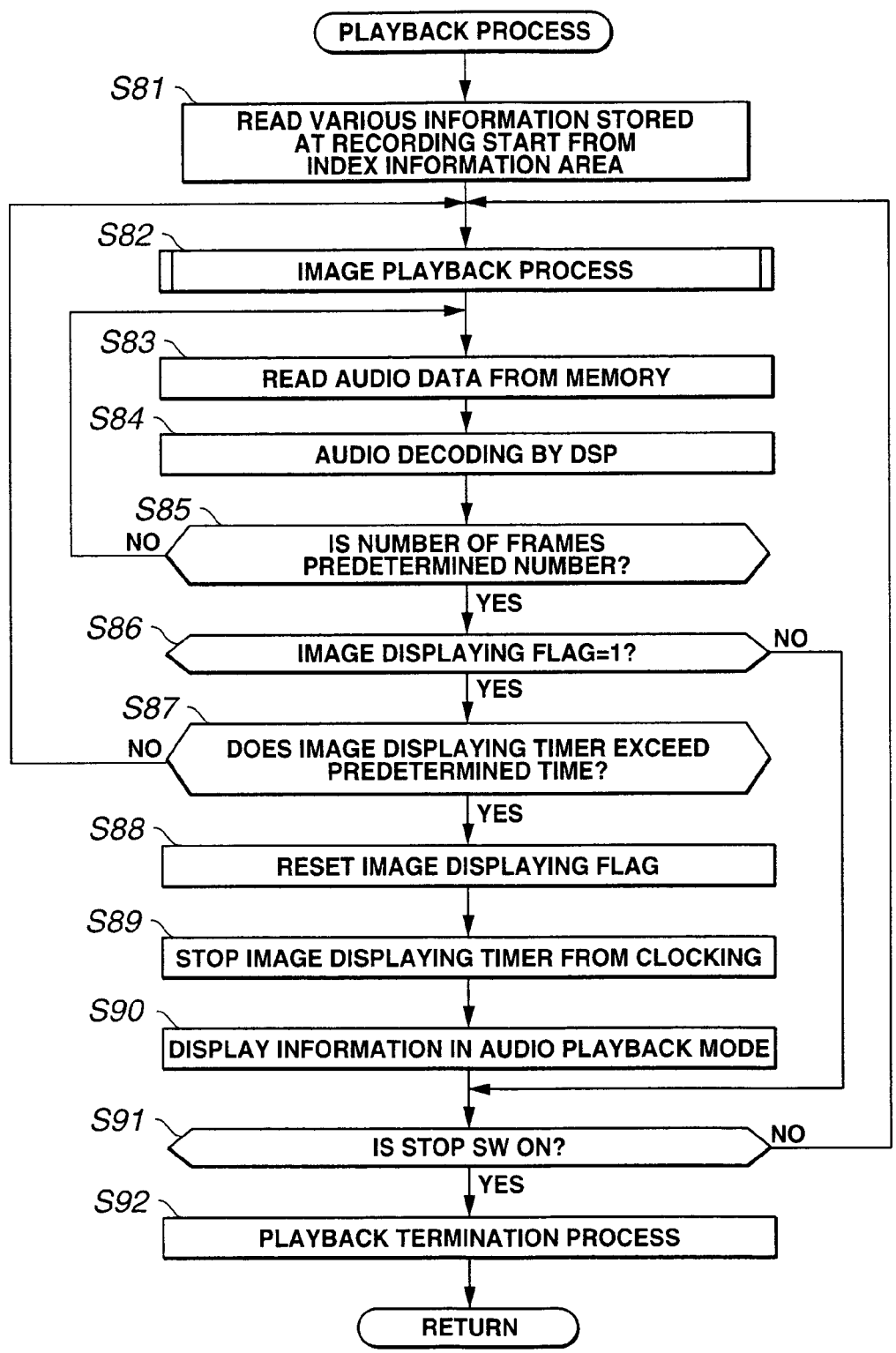
FIG. 7 is a flowchart explaining a playback process in FIG. 3 in detail.

FIG. 7 is the flowchart explaining the playback process in FIG. 3 in detail.

When audio playback is started, in step S81, under the control of the system control unit 30, various information, for example, the recording mode (standard/long) related to the selected audio data area, a file number, and the start address of the audio data storage area, in which the audio data is stored, are read from the index information area in the storage unit 32. The process proceeds to step S82.

In step S82, the system control unit 30 executes a subroutine for an image playback process. After that, in step S83, the system control unit 30 reads audio data stored in the storage unit 32 in order from the start address of the audio data storage area. In step S84, the system control unit 30 controls the digital signal processing unit 33 to decode the audio data. Since decoding is performed every frame, it is assumed that decoding is continuously performed until the number of frames of audio data reaches the predetermined number of frames. While sequentially storing the audio data in the buffer memory (not shown) of the system control unit 30, the system control unit 30 outputs the data as audio signals to the audio playback unit 27.

After the audio data is decoded by the predetermined number of frames in step S85, the system control unit 30 detects the state of an image displaying flag in step S86. If the image displaying flag is set, the display unit 29 in FIG. 2 displays an image simultaneously with the start of audio playback. Then, the process proceeds to step S87. A speaking person (speaker) is recognized in association with audio playback. Generally, speaker recognition is sufficiently performed for several seconds after the start of image display. Accordingly, in step S87, the system control unit 30 determines whether an image displaying timer, which starts clocking in the image playback process, exceeds a predetermined elapsed time. The image playback process will be described later. If the timer does not exceed the predetermined elapsed time, steps S82 to S86 are repetitively performed.

If the timer exceeds the predetermined elapsed time in step S87, the system control unit 30 proceeds the process to step S88 and resets the image displaying flag. In step S89, the system control unit 30 stops the image displaying timer from clocking. In step S90, the system control unit 30 allows to display information (a recording time, a playback elapsed time, a recording mode (standard/long), and a file number) in the normal playback mode.

Steps S82 to S86 are repetitively performed until the stop switch (STOP) is turned on in step S91. When the stop switch (STOP) is turned on, the system control unit 30 proceeds the process to step S92 and then executes a playback termination process to terminate playback. Then, the process is returned.

Next, the "image playback process" in step S82 of the above predetermined subroutines will now be described with reference to a flowchart of FIG. 8, and FIG. 2.

Figure 8:
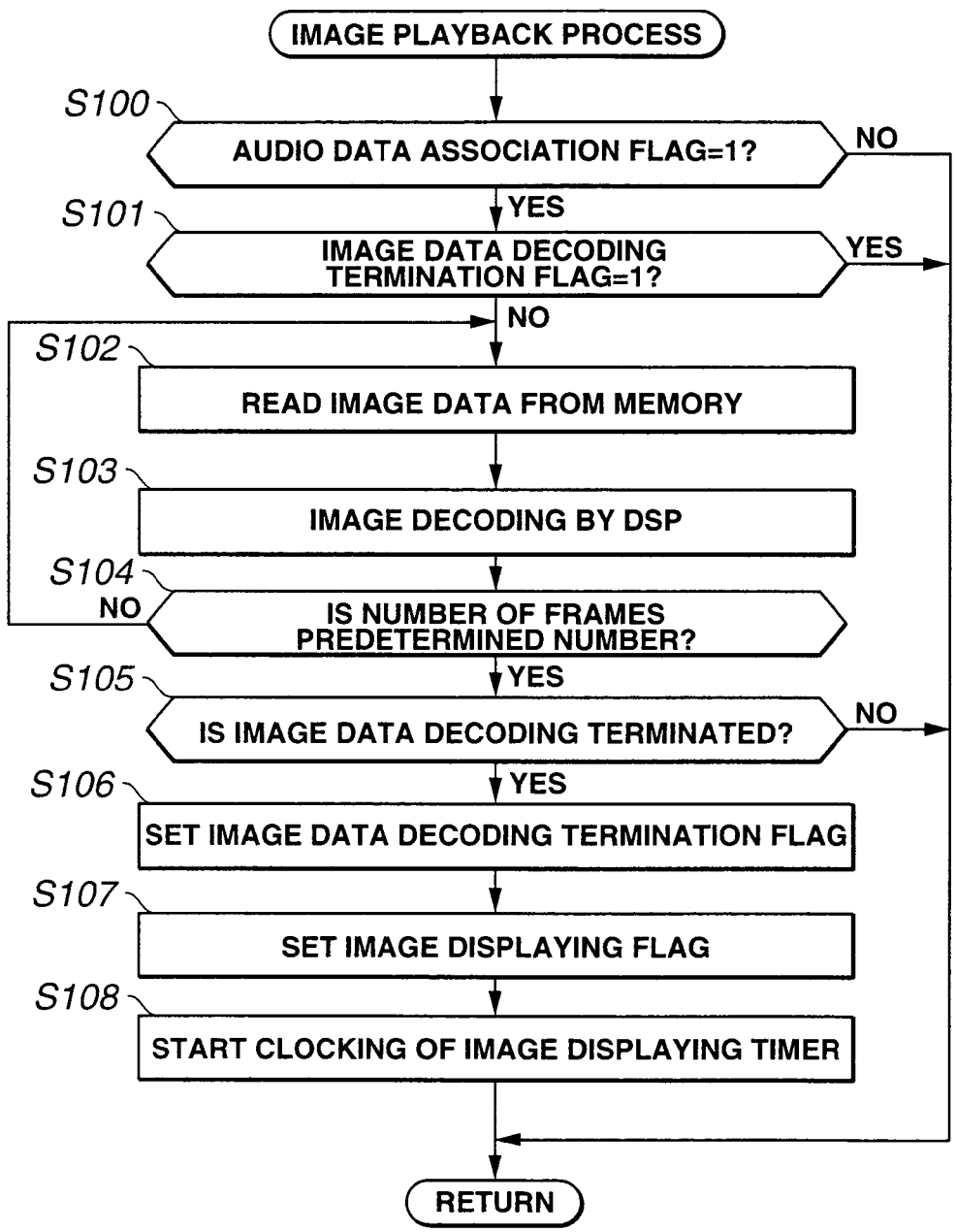
FIG. 8 is a flowchart explaining an image playback process in FIG. 7 in detail.

FIG. 8 is the flowchart explaining the image playback process in FIG. 7 in detail.

In step S100, the system control unit 30 first detects whether an audio data association flag is set. If this flag is not set, the system control unit 30 executes the normal playback process shown in FIG. 7 to decode only audio data. If the flag is set, the system control unit 30 proceeds the process to step S101 and detects whether an image data decoding termination flag is set. If the image data decoding termination flag is set, the process is returned. If the image data decoding termination flag is not set, in step S102, the system control unit 30 reads image data stored in the storage unit 32 in order from the start address of the image data storage area. Subsequently, in step S103, decoding is performed by the digital signal processing unit 33. Decoding is performed every frame in a manner similar to the case of audio data. Accordingly, decoding is continuously performed until the number of frames of image data reaches the predetermined number of frames in step S104. While sequentially storing image data in the buffer memory (not shown) of the system control unit 30, the system control unit 30 outputs the data as image signals to the image playback unit 23.

Steps S100 to S105 are repetitively performed until decoding of the image data is terminated. In step S106, the system control unit 30 sets the image data decoding termination flag simultaneously with the termination of decoding of the image data. In step S107, the system control unit 30 sets the image displaying flag and, in step S108, starts clocking of the image displaying timer, thus terminating the process.

Figure 10:
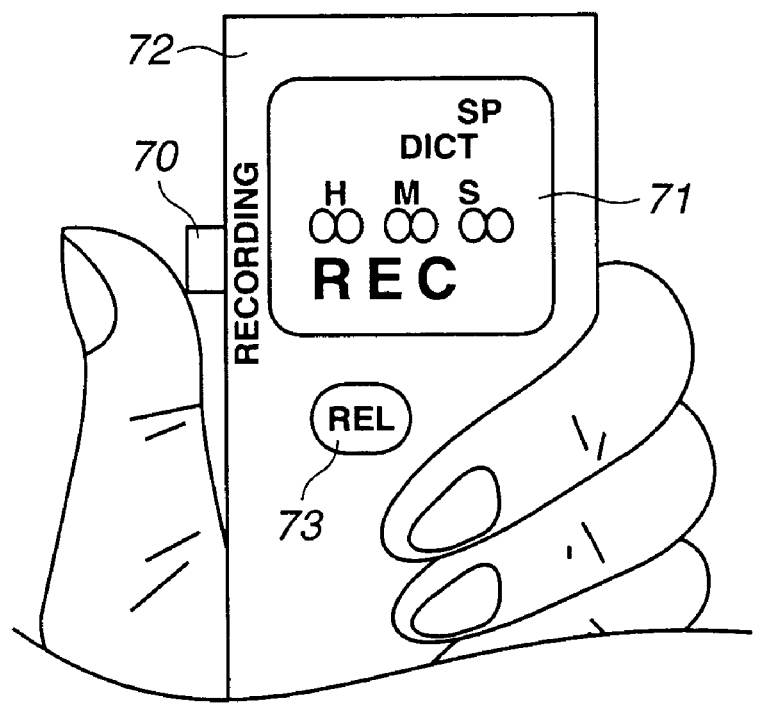
FIG. 10 is a front view of the arrangement of essential parts of the data processing device according to the embodiment, FIG. 10 schematically showing the picture taking state upon recording.
Figure 11:
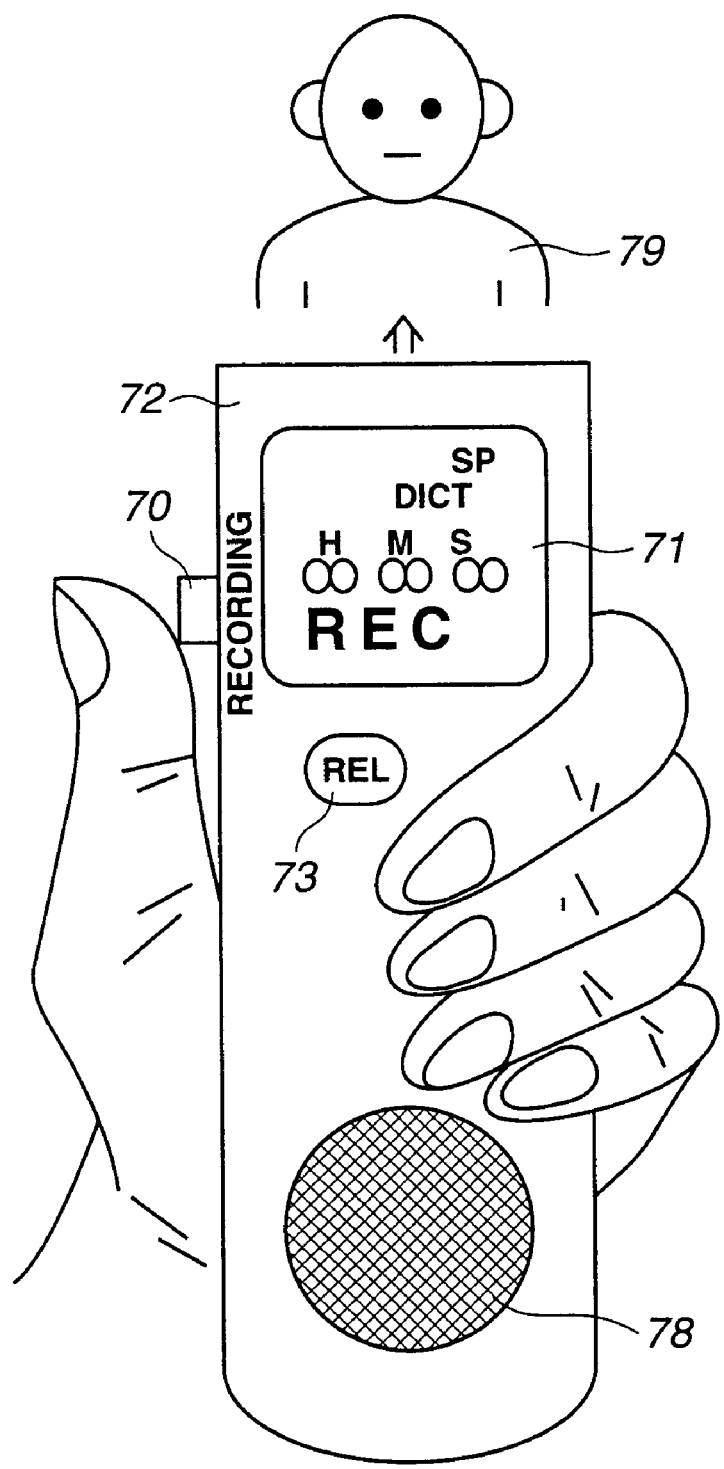
FIG. 11 is a front view of the arrangement of the essential parts of the data processing device according to the first embodiment, FIG. 11 schematically showing the picture taking state upon recording.

Next, the outline of an image capture method upon actual recording will now be described with reference to FIGS. 9, 10, and 11.

Figure 9:
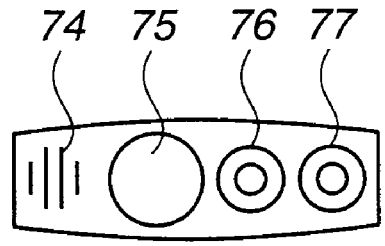
FIG. 9 is a top view of the arrangement of essential parts of the data processing device according to the embodiment, FIG. 9 schematically showing a picture taking state upon recording.

FIG. 9 is a top view of an audio recording and playback apparatus with an imaging function, the audio recording and playback apparatus including the data processing device according to the first embodiment. FIG. 9 schematically shows the picture taking state of the audio recording and playback apparatus upon recording. FIG. 10 is a front view thereof. FIG. 11 is a view showing the service conditions thereof.

On the top surface of a data processing device 72 mentioned above, microphone slits 74, an imaging lens 75, a microphone jack 76, and an earphone jack 77 are arranged in the longitudinal direction. The microphone 25 and the imaging device 21, shown in FIG. 2, are built in the device so as to correspond to the microphone slits 74 and the imaging lens 75, respectively.

A release switch button 73 and a display 71 are arranged in the upper portion on the front surface of the data processing device 72. A recording switch button 70 is arranged on one side surface thereof.

Other operation switch buttons arranged on the data processing device 72 are not shown in the diagram. The operation switch buttons are arranged on the front surface or at least one side surface of the data processing device 72 so that the user can easily control the switches.

Further, speaker holes 78 are arranged in the lower portion on the front surface of the data processing device 72. The speaker 28, shown in FIG. 2, is built in the device so as to correspond to the speaker holes 78. In many cases, light-touch switches, generally called tactile push switches, are used as the operation switches.

The recording switch button 70 of the data processing device 72 is first pressed to turn on a recording switch, so that recording is started. At this time, the display 71 shows initial information indicating the recording start, thus notifying the operator of a recording mode. In this state, as shown in FIG. 11, the operator points the top surface of the data processing device 72 at a speaking person (speaker) 79 and presses the release switch button 73 to turn on a release switch. Thus, the image of the speaker can be captured. Image capture is performed each time the release switch is turned on. Accordingly, even when interviewing a plurality of speakers, the operator can certainly record the images of the speakers so as to correspond to respective speech contents.

Further, in order to certainly record an image, an image captured by the imaging lens 75 can be displayed on the display 71 for a while after the release switch is turned on. After framing of a subject is determined, the operator again presses the release switch, thus executing image capture.

The outline of image playback upon playback will now be described with reference to FIG. 12.

Figure 12:
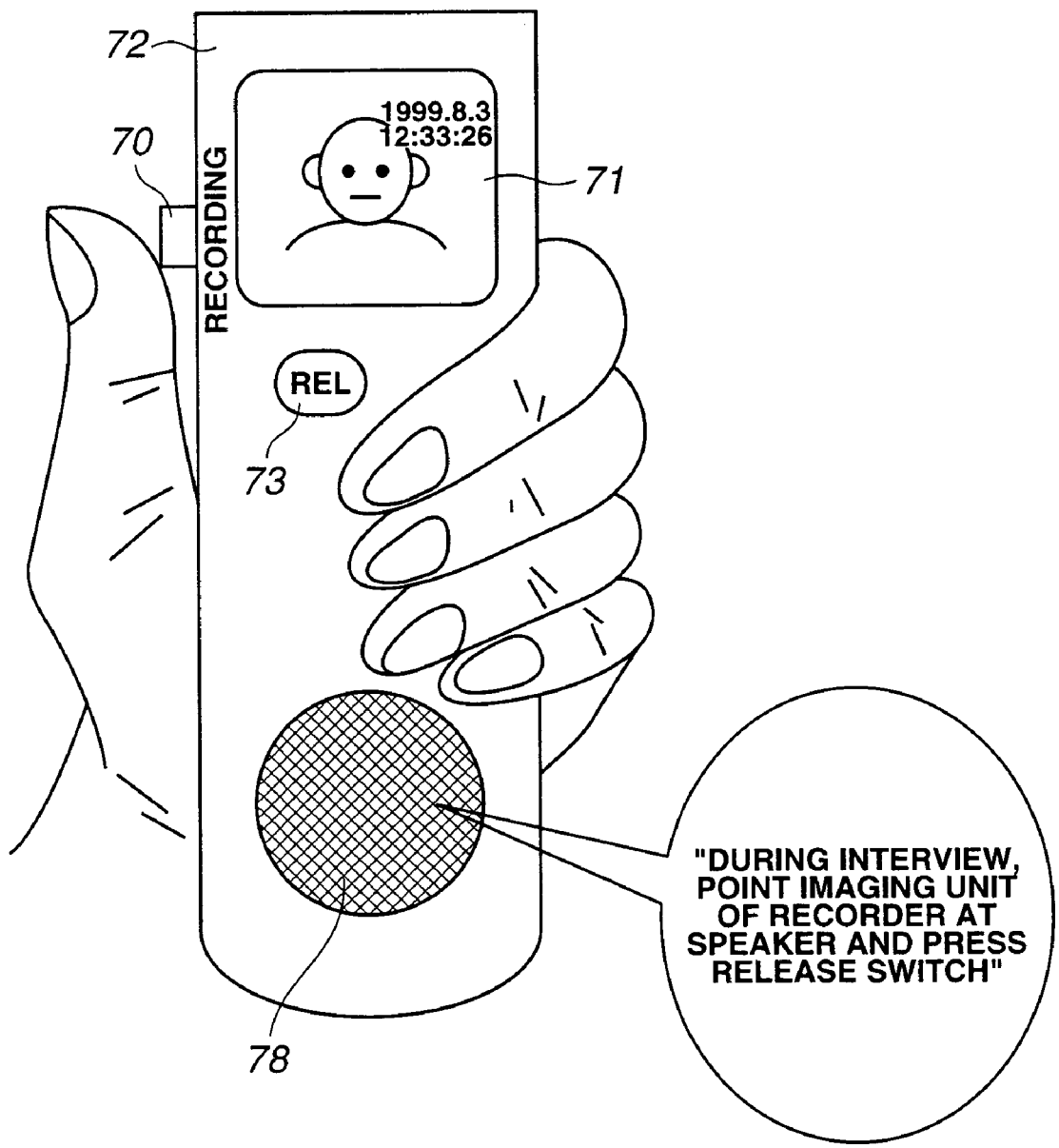
FIG. 12 is a front view of the data processing device according to the first embodiment, FIG. 12 schematically showing an image playback state upon playback.

FIG. 12 is a front view of the data processing device, FIG. 12 showing the outline of image playback upon playback.

A playback switch button (not shown) arranged on the front surface or the side surface of the data processing device 72 is pressed to turn on a playback switch, thus starting the playback operation. The speaker holes 78 generate a voice shown by, for example, a balloon in FIG. 12. Simultaneously, the image of a speaker related to this voice is displayed on the display. The image can be displayed until the playback of the voice related to the image is completed. As mentioned above, it is a matter of course that the image can be displayed for a predetermined period after the playback is started.

If it is not necessary to confirm an image, image display can be completely omitted. If any image related to a sound is not recorded, information (a recording time, a playback elapsed time, a recording mode (standard/long), and a file number) in the normal playback mode is displayed.

In the data processing device with the above-mentioned structure according to the first embodiment of the present invention, in a case where the picture of a subject is taken upon recording, only when a specified switch (not shown) of the SW operation unit 10, for example, the first release switch is pressed, the power can be applied to the imaging unit 7 by the control of the system control unit 30.

In addition, due to the control of the system control unit 30, only when a specified switch (not shown) of the SW operation unit 10, for example, the first release switch or the second release switch is turned off, the application of power to the imaging unit 7 can be cut off.

Furthermore, upon playback, the operator can visually confirm a speaker while listening their speech. Particularly, in the case of interviews, for example, when the speech contents of a plurality of speakers are recorded so as to correspond to the respective speakers in order to form a documentary later, the device is effectively used. Further, both of image data and audio data are stored in the nonvolatile memory. Accordingly, the cost is not increased. Since the imaging lens is arranged so that the picture taking direction is the same as the pointing direction of the microphone, the operator can smoothly capture images upon recording without uncomfortable feelings and hardly gives a disagreeable impression to the speaker.

Next, an IC recorder according to a second embodiment of the present invention will now be described.

The IC recorder according to the second embodiment further has the same structure as that (including, for example, the system control unit 30) of the IC recorder according to the above-mentioned first embodiment and further includes a camera switch (CAMERA) in the SW operation unit 10 or the operation unit 31. The IC recorder according to the second embodiment has two function modes, namely, a camera function mode and an audio recorder function mode. The camera function mode includes the operation modes such as image capture and image recording, namely, includes only the functions of a camera. In the audio recorder function mode, the camera function and audio recording/playback can be executed. The IC recorder is constructed so that the camera switch can switch between these function modes.

Figure 13:
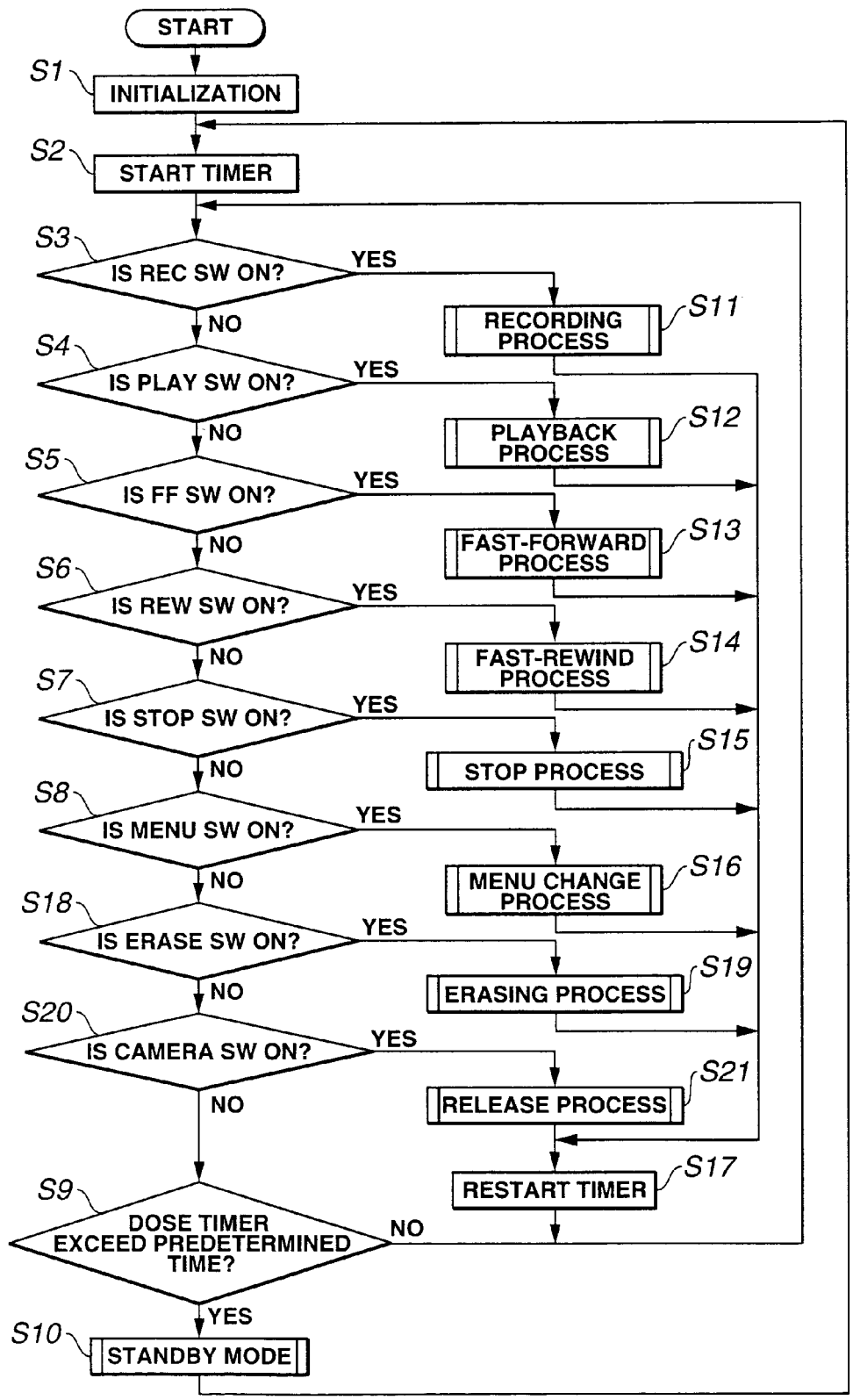
FIG. 13 is a flowchart showing the outline of the main operation of a data processing device according to a second embodiment of the present invention.

FIG. 13 is a flowchart showing the outline of the main operation of the IC recorder according to the second embodiment of the present invention. Since steps excluding steps S20 and S21 in the flowchart of FIG. 13 are the same as those in FIG. 3 of the foregoing first embodiment, the description thereof is omitted.

In step S20, the system control unit 30 determines whether a turned-on switch is the camera switch (CAMERA). If the turned-on switch is the camera switch (CAMERA), the system control unit 30 proceeds the operation to step S21, thus executing a subroutine for a release process. After the subroutine for the release process is executed, the operation proceeds to step S17 and the timer is restarted. Then, the operation proceeds step S3. The operation is returned to the main loop.

The camera switch (CAMERA) is a mechanical switch such as a slide switch which can be forced to hold its own state. A switch such as a tactile push switch, which is turned on only when it is operated, can also be used. In this case, this kind of switch may include function mode holding means for storing the current function mode in the storage unit 32 or a memory such as a RAM in order to hold the function mode.

Figure 14:
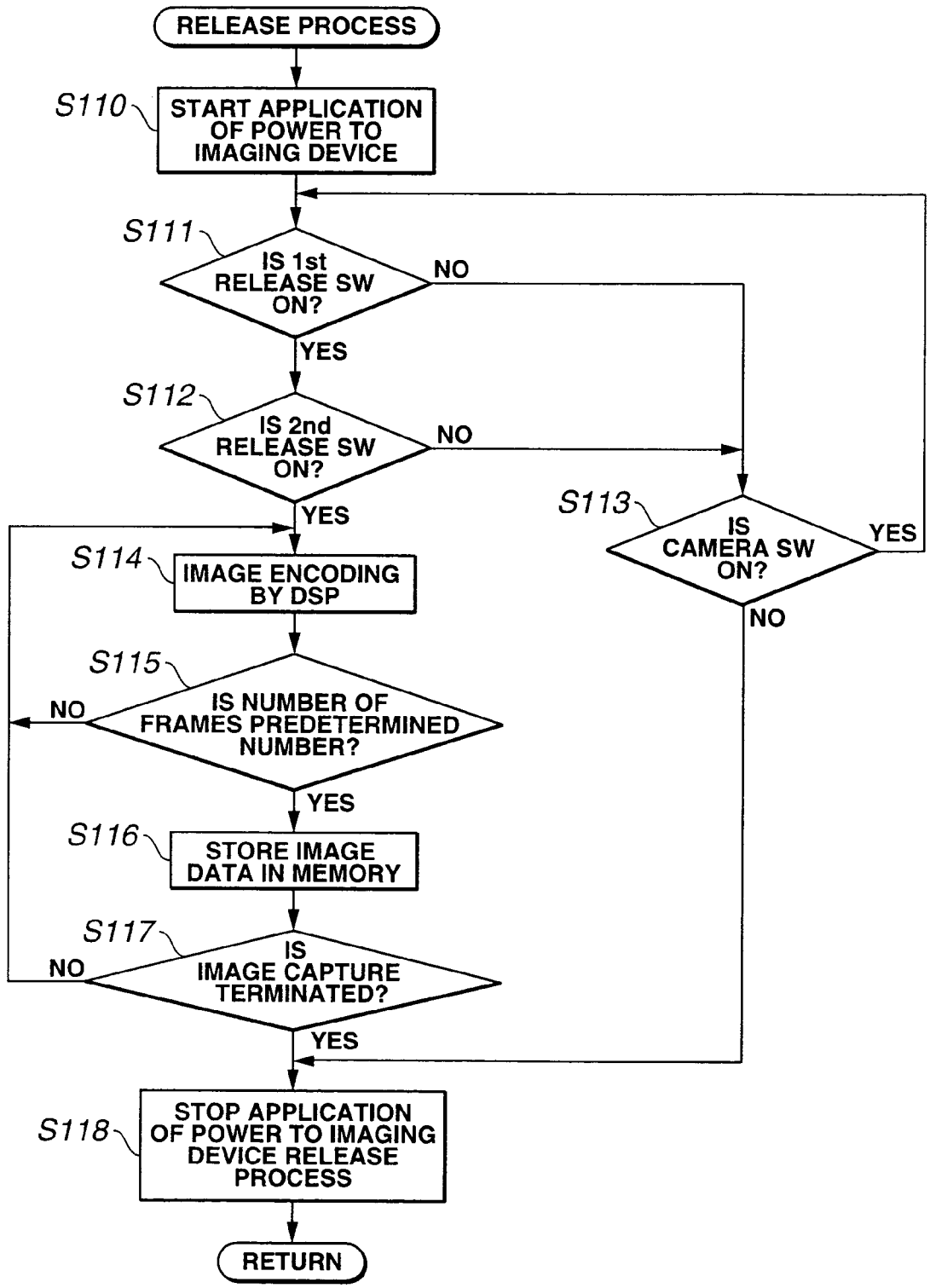
FIG. 14 is a flowchart explaining a release process in FIG. 13 in detail.

Next, the subroutine for the release process in step S21 will now be described with reference to a flowchart of FIG. 14, and FIG. 2.

If the camera switch (CAMERA) is turned on in step S20, as mentioned above, the system control unit 30 proceeds the process to step S21 to execute the subroutine (subroutine related to the camera function mode) for the release process.

In the subroutine for the release process, in step S110, the system control unit 30 first starts the application of power to the imaging device. Then, the system control unit 30 proceeds the process to step S111 to determine whether the first release switch is on or off. If the first release switch is on in step S111, the process proceeds to step S112 to determine whether the second release switch is on or off.

If the first release switch is off in step S111, or if the second release switch is off in step S112, the system control unit 30 proceeds the process to step S113 to determine whether the camera switch (CAMERA) is on or off. If the camera switch (CAMERA) is on in step S113, the process is returned to step S111. In step S111, the detection of the respective states of the first and second release switches is repeated. On the other hand, if the camera switch (CAMERA) is turned off, the process proceeds to step S118. The system control unit 30 stops the application of power to the imaging device, thus terminating the release process as the present subroutine.

If the second release switch is on in step S112, the system control unit 30 proceeds the process to step S114 and then controls the digital signal processing unit 33 to encode an image signal. Encoding is performed every frame and is continuously performed until it is determined in step S115 that the number of frames of image data reaches the predetermined number of frames.

When the number of frames of image data, stored in the buffer memory (not shown) of the system control unit 30, reaches the predetermined number in step S115, the process proceeds to step S116. The system control unit 30 stores image data in the storage unit 32 so that the image data is written in order from the start address of the image data storage area.

The above series of image data writing steps is the same as the content of the foregoing explanation regarding FIG. 4. Accordingly, the detailed description thereof is omitted.

Steps S114 to S116 are repeated until it is determined in step S117 that image capture is completed. When determining in step S117 that image capture is completed, the system control unit 30 proceeds the process to step S118 to stop the application of power to the imaging device, thus terminating the subroutine for the release process.

In the present release process, when the operator operates nothing, the system control unit 30 repeats (loops) steps S111 and S113. The following processing steps can also be performed in order to save power. The system control unit 30 starts a predetermined timer in this loop (the processing step is not shown). When the operator operates nothing for a predetermined time or longer, the process proceeds to step S118 to stop the application of power to the imaging device.

In the data processing device, constructed as mentioned above, according to the second embodiment of the present invention, under the control of the system control unit 30, the picture taking operation can be smoothly performed while power is being saved.

Modifications and variations made by partially combining the above embodiments are included in the present invention.

In this invention, it is apparent that working modes different in a wide range can be formed on this basis of this invention without departing from the spirit and scope of the invention. This invention is not restricted by any specific embodiment except being limited by the appended claims.

What is claimed is:

1. A data processing device comprising:
   an imaging part for taking a picture as image data;
   a recording part for converting an input sound into audio data and recording the data;
   a mode capable of selecting a first operation mode in which picture taking can be performed by the imaging part with a shutter release operation only during audio recording by the recording part or a second operation mode in which recording by the recording part is forbidden and only picture taking by the imaging part with the shutter release operation can be performed; and
   a controller for controlling the application of power to the imaging part based on a shutter release state, if the first operation mode is selected, and independent of the shutter release state if the second operation mode is selected.

2. The data processing device according to claim 1, wherein
   when the first operation mode is selected by the mode selector, the controller applies power to the imaging part so long as the shutter release operation is performed.

3. The data processing device according to claim 2, further comprising:
   an instruction part for instructing picture taking, wherein the shutter release operation includes an instructing operation by the picture taking instruction part.

4. The data processing device according to claim 3, wherein the instruction part comprises a two-stage switch and the shutter release operation includes an operation to press the switch to a first stage.

5. The data processing device according to claim 4, wherein the control controller starts the application of power to the imaging part by the operation to press the switch to the first stage and stops the application of power to the imaging part on the basis of the turn-off of the pressed switch.

6. The data processing device according to claim 2, further comprising:

a display for displaying information, wherein while information for audio recording is displayed on the display when the first operation is selected and an audio recording is performed, an image taken by the imaging part is displayed on the display when a shutter release operation is performed.

7. The data processing device according to claim 1, wherein when the second operation mode is selected by the mode selector, the controller immediately applies power to the imaging part.

8. The data processing device according to claim 7, wherein when the first operation mode is selected by the mode selector, the controller applies power to the imaging part so long as a shutter release operation is performed.

9. The data processing device according to claim 8, further comprising:

an instruction part for instructing picture taking, wherein the shutter release operation includes an instructing operation by the picture taking instruction part.

10. The data processing device according to claim 9, wherein the instruction part comprises a two-stage switch and the shutter release operation includes an operation to press the switch to a first stage.

11. The data processing device according to claim 10, wherein the controller starts the application of power to the imaging part by the operation to press the switch to the first stage and stops the application of power to the imaging part on the basis of the turn-off of the pressed switch.

12. The data processing device of claim 1, wherein the controller use both (1) the operation mode selected and (2) the shutter release state for controlling the application of power to the imaging part.

* * * * *